Oct. 22, 1957 C. H. LANGSTON 2,810,141
COMBINED PIPE THREADING AND REAMING MACHINE
HAVING A REVERSIBLE SPEED REDUCTION UNIT
Filed June 17, 1954 2 Sheets-Sheet 1
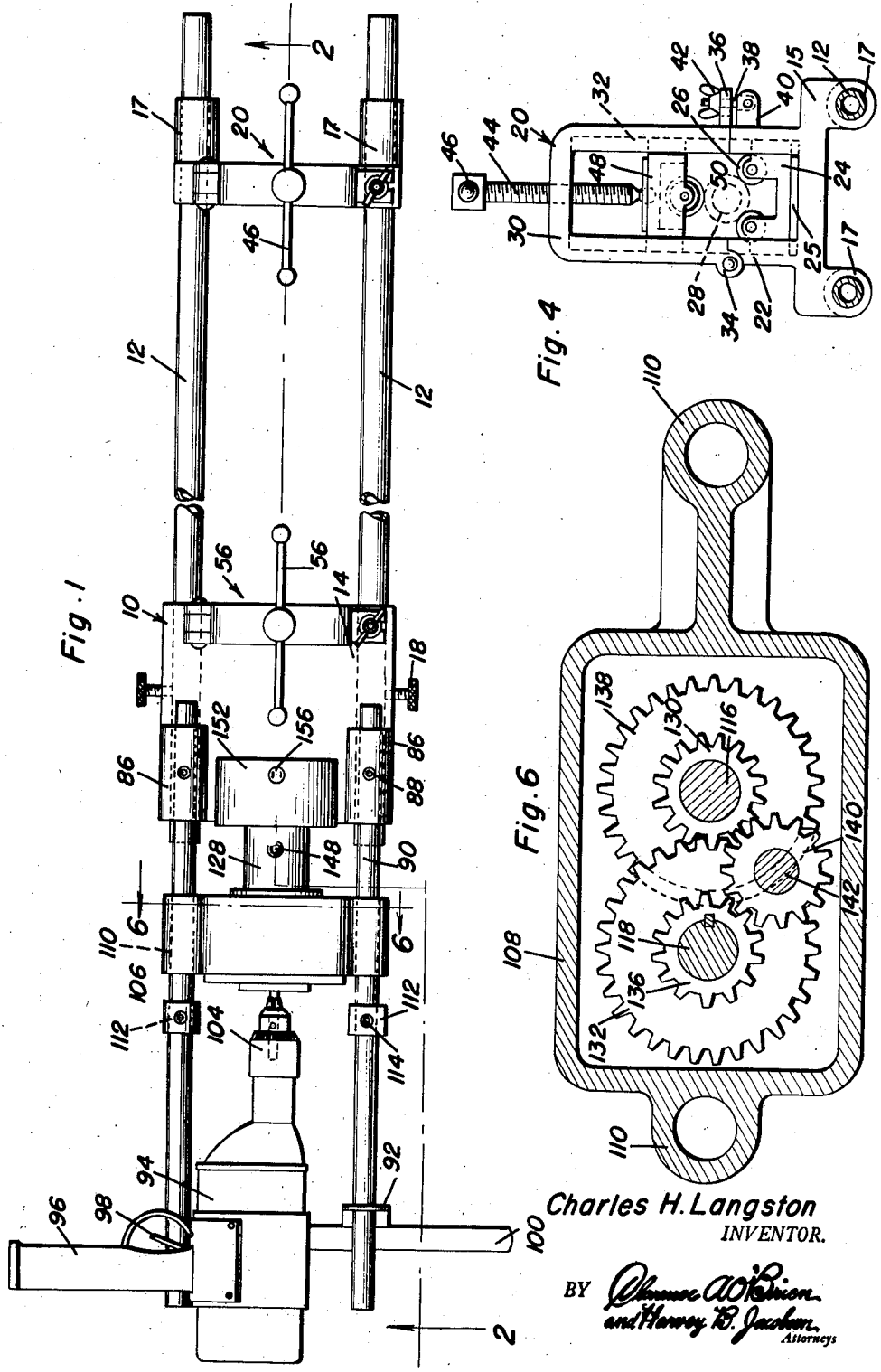
Charles H. Langston
INVENTOR.

Oct. 22, 1957 C. H. LANGSTON 2,810,141
COMBINED PIPE THREADING AND REAMING MACHINE
HAVING A REVERSIBLE SPEED REDUCTION UNIT
Filed June 17, 1954 2 Sheets-Sheet 2
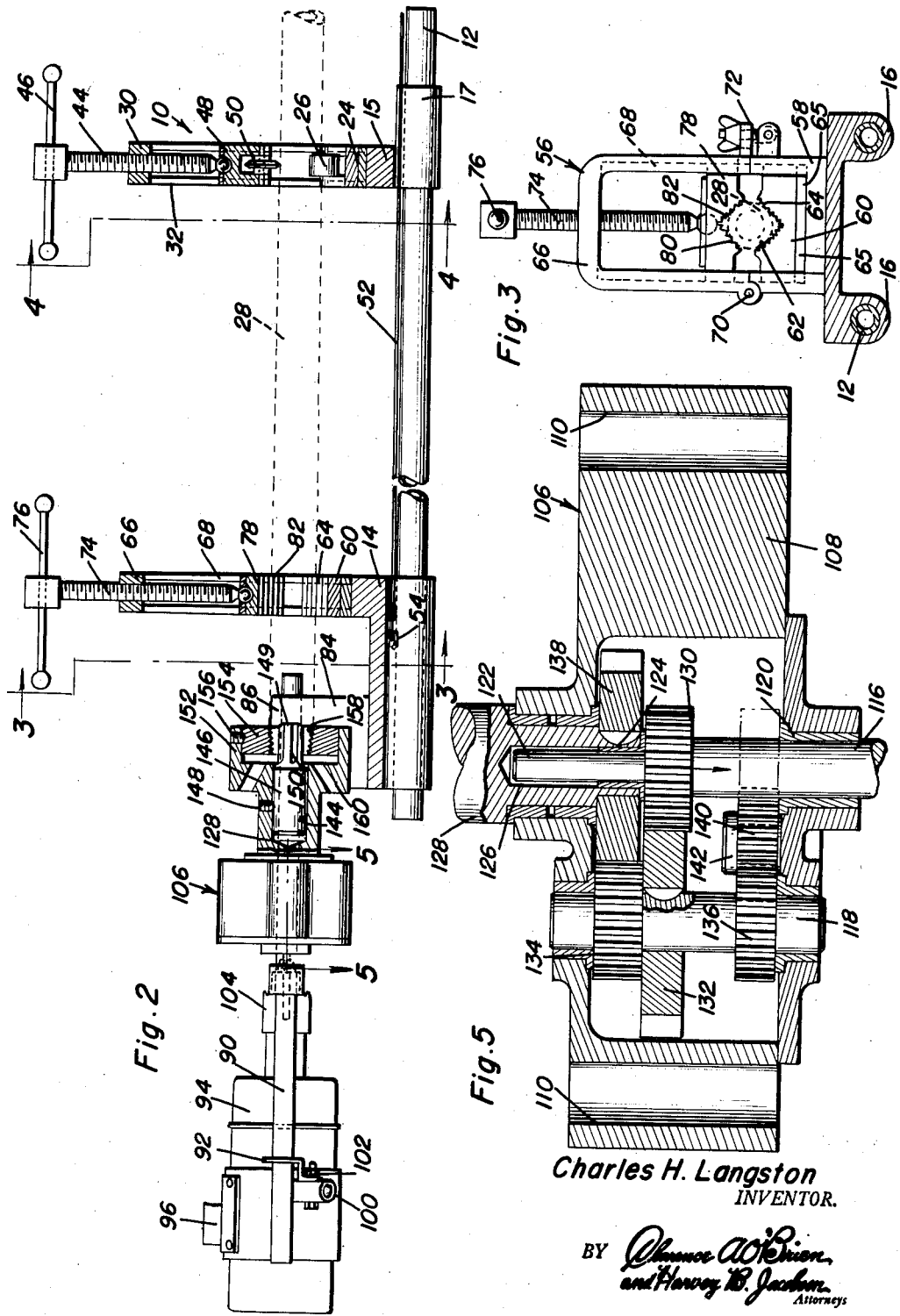
Charles H. Langston
INVENTOR.

United States Patent Office 2,810,141
Patented Oct. 22, 1957

2,810,141

COMBINED PIPE THREADING AND REAMING MACHINE HAVING A REVERSIBLE SPEED REDUCTION UNIT

Charles H. Langston, Bakersfield, Calif.

Application June 17, 1954, Serial No. 437,502

1 Claim. (Cl. 10—87)

This invention relates to a pipe threading machine and more specifically provides a device for quickly and easily threading pipe and also cutting pipe at a desired length.

An object of this invention is to provide a pipe threading machine designed primarily for use in the plumbing and related trade, wherein a machine is provided for temporary association with a conventional portable electric motor such as those employed in portable drills, or the like, wherein the electric motor provides a source of power for rotating pipe threading dies for easily, quickly and efficiently threading pipe thereby reducing the time and work necessary for the threading operation.

Another object of this invention is to provide a pipe threading machine having means associated therewith for cutting the pipe at a desired length.

Yet another important object of this invention is to provide a pipe threading machine having a rotatable die with a centering reamer associated therewith wherein the die will be guided onto the end of the pipe and at the same time the central reamer will guide the pipe and perform the reaming operation.

A further object of this invention is to provide a pipe threading machine having a reversing feature wherein the pipe threading dies may be reversed for removal from the pipe.

Other objects of the present invention include simplicity of construction, portability, adaptability and inexpensive construction.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the pipe threading machine of the present invention;

Figure 2 is a longitudinal, vertical sectional view taken substantially along section line 2—2 of Figure 1 showing the structural details of the pipe threading machine;

Figure 3 is a transverse, vertical sectional view taken substantially along section line 3—3 of Figure 2 showing the details of construction of the pipe gripping device;

Figure 4 is a transverse, vertical sectional view taken substantially along section line 4—4 of Figure 2 showing the details of construction of the pipe cutting attachment;

Figure 5 is a detailed, top plan sectional view taken substantially along section line 5—5 of Figure 2 showing the details of construction of the reversing mechanism; and Figure 6 is a transverse, vertical sectional view taken substantially along section line 6—6 of Figure 1 showing further structural details of the reduction gear mechanism and the reversing gear mechanism.

Referring now specifically to the drawings, it will be seen that the numeral 10 generally designates the pipe threading machine of the present invention. The pipe threading machine 10 includes a pair of generally elongated tubular members 12 that are positioned in parallel spaced relation and are substantially of equal length. The tubular members 12 may be of any length as desired by each individual person. A plate 14 having a pair of tubular members 16 formed therewith are secured on the tubular members 12 by suitable setscrews 18. The setscrews 18 are provided with a suitable knurled head for manipulation wherein the plate 14 and tubular members 16 formed integrally therewith may be positioned longitudinally of the tubular members 12.

Referring now specifically to Figure 4, it will be seen that a pipe cutter is generally indicated by the numeral 20 and includes a transverse plate 15 having a pair of tubular members 17 integrally formed along each edge thereof for sliding engagement with the tubular members 12. It will be noted that there are no setscrews for retaining this plate 15 in adjusted position, although they may be provided if desired. A pair of upstanding channel members 22 are secured to the plate 15 in facing position and a U-shaped member 30 having channel shaped legs 32 is positioned over the upstanding member 22 and one of the legs 32 of the U-shaped member 30 is provided with pivot means 34 for pivotally connecting the U-shaped member 30 to one of the upstanding members 22. The other leg of the U-shaped member 30 is provided with a pair of lugs 36 which receives a pivotal bolt 38 mounted on pivot lugs 40 on the other of the upstanding members 22 for retaining the U-shaped member 30 directly over the upstanding members 22 by use of a wing nut 42 on the bolt 38. A jaw member 24 is positioned in the facing channel members 22 and the jaw member 24 includes a pair of spaced rollers 26 for rotatably supporting a pipe 28. A threaded member 44 extends through a threaded aperture in the bight portion of the U-shaped member 30 and includes a T-shaped handle 46 at its upper end and a sliding jaw 48 slidable in the channel member 32 forming the legs of the U-shaped member 30. The sliding jaw 48 is provided with a rotatable cutter 50 for engaging the pipe 28 in opposition to the rollers 26. When it is desired to cut the pipe 26, the T-handle 46 is turned thereby moving the cutter 50 downwardly wherein the pipe 28 will be cut off at a desired length by such manipulation. Spacer blocks 25 of various thicknesses are positioned under the jaw member 24 for positioning various sized pipe in centered relation to the pipe die 154. As illustrated in Figure 2, a tape line 52 is provided and connected to a hook 54 on the bottom of the plate 14 and extends longitudinally along one of the tubular members 12 for measuring and determining the length of pipe 28 to be cut off. Normally, the rollers 26 form a support for the pipe 28 wherein the pipe is held in non-rotating position by a means to be described hereinafter.

Referring now specifically to Figure 3, it will be seen that a pipe vise generally indicated by the numeral 56 is provided with a pair of upstanding members 58 that are channel shaped and face each other for slidably receiving a jaw 60 having a V-shaped notch 62 therein with teeth 64, for engaging the pipe 28. Spacer blocks 65 of various thicknesses are positioned under the jaw member 60 for positioning various sized pipe in centered relation to the pipe die 154. A U-shaped member 66 having channel shaped legs 68 is positioned over the upstanding member 58 and one of the legs 68 is pivotally connected to one of the upstanding members 58 by pivot means 70 and the other of the legs 68 is connected to the other of the upstanding members 58 by fastening means 72 which are substantially similar to the fastening means utilized in the pipe cutter 20. The bight portion of the U-shaped member 66 is provided with a screw threaded member 74 extending through a threaded aperture therein and including a T-shaped handle 76 on its outer end and a jaw 78 on its inner end having a V-notch 80 therein with suitable serrated teeth 82 for gripping the pipe 28 between the teeth 64 and 82 on the respective V-shaped notches 62 and 80 wherein the pipe 28 is rigidly gripped in non-rotative position for threading the end thereof. It will be seen that the upstanding members 58 are adjacent one edge of the plate 14 and the other end of the plate is provided with a pair of bracket members 84 for supporting a pair of tubular members 86 having setscrews 88 therein for adjustably receiving a pair of tubular members 90 that extend outwardly therefrom in adjusted position. The outer ends of the members 90 which may be tubular or solid, as desired, slidably receive a bracket 92 on a portable electric motor 94 having a handle 96 on one end thereof with a suitable operating switch 98 positioned adjacent thereto. The other side of the motor 94 is provided with a projecting pipe 100 which acts as a handle and has a bracket 92 rigid therewith by suitable clamping bolts 102 wherein the motor 94 may be moved longitudinally on the members 90 and guided in its movement by the bracket 92 that is slidable on one of the members 90. The motor 94 is provided with the usual tool clamping chuck 104 for a purpose described hereinafter.

A reduction gearing and reversing mechanism 106 is provided with a casing 108 having a pair of tubular members 110 formed integrally with each side thereof for slidable engagement with the rods or members 90 and a pair of collars 112 are positioned on the members 90 by setscrews 114 wherein the movement of the reduction and reversing mechanism 106 is limited between the collars 112 and the tubular members 86 for a purpose described hereinafter.

Referring now specifically to Figures 5 and 6, it will be seen that the reversing and reduction mechanism 106 includes a pair of parallel shafts 116 and 118 wherein the shaft 116 is the input shaft and extends exteriorly of the casing 108 for gripping and rotation by the chuck 104 on the electric motor 94. The shaft 116 is slidably supported in a bearing 120 at one end thereof and includes a reduced end portion 122 at its other end for sliding engagement with a bearing 124 positioned in a socket 126 in an output shaft 128 wherein the output shaft 128 forms a guide and bearing for the reduced end 122 of the shaft 116. A driving gear 130 is rigidly secured to the shaft 116 for meshing engagement with a gear 132 rigidly secured to the shaft 118 when the device is being driven in its forward direction. The gear 132 is secured to the shaft adjacent the central portion and a pair of gears 134 and 136 are secured adjacent the outer end of the shaft 118. The gear 134 is in constant meshing engagement with an enlarged gear 138 that is rigidly secured to the output shaft 128 wherein the speed of the input shaft 116 will be greatly reduced when it reaches the output shaft 128. When it is desired to reverse the mechanism, the shaft 116 is moved rearwardly by grasping the handle members 96 and 100 of the motor 94 and moving outwardly on the rods 90 wherein the shaft 116 will be moved rearwardly along with the gear 130 mounted thereon. The gear 130 will then mesh with an idler gear 140 mounted on a stud 142 on the casing 108 wherein the gear 140 is in constant meshing engagement with the gear 136 on the shaft 118. It will be seen that the rotational motion of the shaft 116 will be reversed due to the idler gear 140 wherein the output shaft will be turned in a reverse direction at an increased speed. The ratio of reduction may be any suitable ration although it has been found that a 25 to 1 reduction is adequate for most purposes.

Referring now specifically to Figure 2, it will be seen that the output shaft 128 is provided with a socket 144 for receiving a centering reamer 146 that is held therein by a setscrew 148. The centering reamer 146 is provided with a tapered outer end 149 and the usual sharpened ribs 150 for engaging and reaming the end of a pipe 28. The extreme outer end of the output shaft 128 is enlarged as indicated by the numberal 152 and provided with an enlarged recess for receiving a pipe die 154 that is secured in position by a setscrew 156 and the pipe die 154 is provided with the usual thread forming tapered threads 158 for engaging and forming threads on the pipe 28. The enlarged portion 152 of the shaft 128 is provided with suitable apertures 160 for receiving cooling oil and permitting discharge of any thread cutting or material deposited within the interior of the enlarged recess wherein the device may be retained in a relatively cool, clean and well lubricated condition.

In operation, the pipe 28 is positioned in the pipe vise 56 and clamped therein in the obvious manner and the pipe cutter 20 is used as a rest in spaced relation to the pipe vise 56 thereby forming a rigid support for the pipe 28. The end of the pipe 28 that is to be threaded is positioned forwardly of the pipe vise 56 and after a suitable die 154 has been positioned in the enlarged portion 152 of the output shaft 128, the motor 94, chuck 104 and the entire reduction gearing mechanism 106 is moved along the members 90 so that the die 154 engages the end of the pipe and the threads are formed by the thread forming members 158. In this position, the input shaft 166 is forward and engages the enlarged gear 132. When it is desired to remove the die 154 from the pipe 28 the shaft 116 and motor 94 are stopped by de-energizing the motor and are moved rearwardly for engaging the gear 130 with the gear 140 thereby reversing the output shaft 128. After the thread has been run up on the pipe 28, the vise 56 may be loosened and the cutter 20 tightened for cutting off the pipe at a desired length. The pipe 28 will be rotated in the cutter 20 since the die 154 will be threaded completely onto the pipe 28 thereby rotating the pipe 28 due to the taper and frictional resistance between the die 154 and pipe 28.

The machine 10 is easily carried and is similar in size and weight to many electric hand tools and may be used in very small spaces with or without the vise and cutter. The device is especially useful in threading close nipples on the job thereby effecting a saving in time expended doing a job.

From the foregoing, the construction and operation of the device will be readily understood that further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A pipe threading and reaming machine comprising an elongated supporting frame, a pipe vise, an enlarged base on said pipe vise, means on said base adjustably mounting the base and vise on said frame, a pair of spaced parallel tubular sleeves rigidly disposed on said base, a pair of longitudinally extending guide rods adjustably mounted in said sleeves, a conventional portable electric drill motor having a unidirectional output shaft with a gripping chuck on the free end thereof, said motor having a pair diametrically opposed radially extending handle members, a bracket on one of said handles in sliding engagement with one of said guide rods, the other handle slidably resting against the other guide rod, a reversing and reduction gear unit having a casing, a tubular member on each side of said casing slidably disposed on said guide rods thereby permitting longitudinal sliding movement of the unit, said unit having an input shaft and an output shaft journaled in the casing and disposed in longitudinal alignment, the inner end of said output shaft having a socket, the inner end of the input shaft having a longitudinally extending end portion of reduced cross sectional area rotatably and slidably journaled in said socket, the outer end of the input shaft being gripped by the chuck on said motor whereby the input shaft may be driven by the unidirectional output shaft of the motor, a lay shaft journaled in said casing in spaced parallel relation to the input and output shaft, an end gear adjacent each end of said lay shaft, a central gear on said lay shaft between said end gears, an idler gear journaled on said casing and in constant mesh with one of said end gears, an output gear on said output shaft in constant mesh with the other end gear, a drive gear mounted on said input shaft for meshing with the idler gear or central gear in response to longitudinal movement of the input shaft for converting the unidirectional rotation of the drill motor to selective clockwise and counterclockwise rotation of the output shaft of the unit in response to longitudinal shifting of the drill motor on the guide rods, said output gear being larger than the end gear enmeshed therewith for providing a speed reduction in each direction of rotation, said output shaft of the reversing and reduction gear unit having an enlarged outer end having an enlarged recess for receiving a pipe die, means securing the pipe die in said recess, said output shaft of the unit having a longitudinally extending socket communicating with the recess for receiving a reamer, means for clamping the reamer in said socket with the working end of the reamer extending concentrically through the pipe die for engagement with the interior end of a pipe clamped in the pipe vise for guiding and steadying the die during the thread cutting operation while also reaming the end of the pipe, the output shaft of the motor, the input shaft of the unit, the output shaft of the unit all being in longitudinal alignment with the pipe whereby inward longitudinal force exerted on the handle members on the motor will cause inward shifting of the input shaft thereby assuring rotation of the pipe threading die in a clockwise direction for cutting threads with the force exerted on the handle members also serving to bring the reamer and die into engagement with the end of the pipe, said input shaft sliding outwardly for reversing the direction of rotation of the die upon application of outward longitudinal force on the handle members, thereby rendering the device responsive solely to energization and longitudinal movement of the motor.

References Cited in the file of this patent

UNITED STATES PATENTS

| | | |
|---|---|---|
| 701,143 | Brown | May 27, 1902 |
| 712,445 | Thompson | Oct. 28, 1902 |
| 780,017 | Albee | Jan. 17, 1905 |
| 943,009 | Dorman | Dec. 14, 1909 |
| 1,181,079 | Kelso | Apr. 25, 1916 |
| 1,196,710 | Mattingly | Aug. 29, 1916 |
| 1,461,871 | Funk | July 17, 1923 |
| 2,026,471 | Hoelzel | Dec. 31, 1935 |
| 2,314,016 | Peters | Mar. 16, 1943 |
| 2,685,095 | Butler | Aug. 3, 1954 |